United States Patent Office 2,875,031
Patented Feb. 24, 1959

2,875,031
METHOD OF KILLING WEEDS

Winfried Kruckenberg, Leverkusen-Bayerwerk, and Ludwig Eue, Koln-Mulheim, Germany, assignors to Farbenfabriken Bayer Aktiengesellschaft, Leverkusen, Germany, a corporation of Germany No Drawing. Application May 31, 1956
Serial No. 588,270

Claims priority, application Germany June 3, 1955

4 Claims. (Cl. 71—2.5)

The invention relates to weed-killing compositions containing as active ingredients di-mercapto-thio-diazoles of the general formula $$R-S-C\underset{S}{\overset{N---N}{\underset{\diagdown\diagup}{\|\phantom{xx}\|}}}C-S-R$$

wherein R may be a hydrogen atom, a salt forming group or an organic radical. By the term "weeds" there are to be understood in the widest sense plants growing on places where they are not wanted. Compounds of the aforesaid group are already effective at a low concentration as a so-called contact herbicide.

It has been found that germinating seeds do not grow when exposed to the action of di-mercapto-thio-diazoles and that grown plants suffer great damage leading to the decay of the whole plant. Thus, weeds may be destroyed at any stage of growth starting from germination by the application of these compounds.

Examples of weeds which may be destroyed are *Chenopodium album*, Senecio spec., Sonchus spec., Brassica spec., *Rhaphanus raphanistrum* and Stellaria media, and others.

The di-mercapto-thio-diazoles which are suitable as effective weed killers correspond to the following formula $$R-S-C\underset{S}{\overset{N---N}{\underset{\diagdown\diagup}{\|\phantom{xx}\|}}}C-S-R$$

in which R is hydrogen, a salt forming metal such as sodium, potassium, calcium, ammonium or any organic substituent such as alkyl, aryl or acyl groups. Especially suitable compounds of the last group are such ones which contain as an alkyl group a methyl, ethyl, propyl, isopropyl, allyl group, as an aryl group a phenyl group which may be further substituted by preferably alkyl, halogen or nitrosubstituents and as an acyl group the radical of an aliphatic or aromatic carboxylic acid; of carbonic acid or of a carbamic acid. The preparation of all these compounds may be carried out according to processes well known from the literature if they are not known per se, for example by proceeding in analogous manner as described in the German printed application of Hans Krzikalla et al., Ser. No. B 27 085 IVc/12 p, printed September 1, 1955.

The weed killers may especially be used in admixture with an organic solvent such as alcohols, acetone, dimethyl formamide and a liquid diluent or carrier such as an oil (e. g. kerosene or petrol fractions) or water at a concentration which ensures a satisfactory and evenly dispersion. Suitable compositions contain generally 0.1% to 20% of di-mercapto-thio-diazoles or its derivatives, especially dilutions from 1–5% are to be used. These compositions have to be applied in a quantity of about 500 to 1000 liters per hectare.

Aqueous or oily dispersions, emulsions or solutions of di-mercapto-thio-diazoles may advantageously contain additional wetting, emulsifying or dispersing agents in order to secure a uniform dispersion, spray or wetting when used in mechanical or manual spraying or atomising devices.

Suitable wetting emulsifying or dispersing agents are e. g. higher aliphatic sulfonic acids or their salts, high molecular polyglycolates derived from aliphatic or aromatic alcohols and ethylenoxide, soaps and other commonly used emulsifiers. If special requirements have to be met, the weed killer may also be used in the form of a dust or powder, using inert materials such as silica, talcum, bentonite, chalk or clay as diluents. Such mixtures may also contain dispersing or wetting agents if the composition is to be used in a slurry.

The weed killers described in the present invention are also especially suited for the pre-emergence treatment of onion, beet and carrot seeds since they destroy the weeds emerged before the treatment with weed killing compounds while the seeds of the onions, beets and carrots are not affected.

The following examples are given for the purpose of illustrating the invention.

Example 1

A one percent aqueous emulsion of di-mercapto-thio-diazole of the formula $$H_3C-S-C\underset{S}{\overset{N---N}{\underset{\diagdown\diagup}{\|\phantom{xx}\|}}}C-S-CH_3$$

containing one percent of a known emulsifier derived from an aliphatic alcohol and ethylene oxide and one percent of dimethyl formamide destroys seedlings or young plants of *Chenopodium album* when applied in a quantity of 500–1000 litres per hectare.

Instead of the above compound the corresponding diethyl or diallyl compound may be used.

Example 2

A five percent aqueous emulsion of di-(2,4-dinitrophenyl)-mercapto-thio-diazole of the formula $$NO_2-\underset{NO_2}{\underset{|}{\bigcirc}}-S-C\underset{S}{\overset{N---N}{\underset{\diagdown\diagup}{\|\phantom{xx}\|}}}C-S-\underset{NO_2}{\underset{|}{\bigcirc}}-NO_2$$

containing 5 percent of a known emulsifier derived from an aromatic alcohol and ethylene oxide and 5 percent of alcohol destroys seedlings and young plants of *Rhaphanus raphanistrum* and Stellaria media when applied in a quantity of 1000 liters per hectare.

Example 3

A five percent emulsion of di-(N-dimethyl-carbamic acid)-mercapto-thio-diazole of the formula $$\underset{CH_3}{\overset{CH_3}{\diagdown}}N-\overset{O}{\underset{\|}{C}}-S-C\underset{S}{\overset{N---N}{\underset{\diagdown\diagup}{\|\phantom{xx}\|}}}C-S-\overset{O}{\underset{\|}{C}}-N\underset{CH_3}{\overset{CH_3}{\diagup}}$$

containing 5 percent of a known emulsifier derived from an aromatic alcohol and ethylene oxide and 5 percent of acetone destroys seedlings and young plants of Senecio spec. when applied in a quantity of 1000 liters per hectare.

Example 4

A five percent aqueous emulsion of di-sodium-mercapto-thio-diazole containing 5 percent of a known emulsifier derived from an aromatic alcohol and ethylene oxide and 5 percent of acetone destroys seedlings and young plants of Sonchus spec.

Example 5

A five percent aqueous emulsion of di-mercapto-thio-diazole containing 5 percent of a known emulsifier derived from an aromatic alcohol and ethylene oxide and 5 percent of acetone destroys seedlings and young plants of Brassica spec.

Example 6

Eight days after the seeding of onions, beets or carrots the soil is treated with a 2.5 percent emulsion of a di-mercapto-thio-diazole of the formula

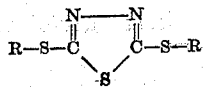

containing 2.5 percent of a known emulsifier derived from an aliphatic alcohol and ethylene oxide and 2.5 percent of dimethyl formamide in a quantity of 1000 liters per hectare. After this treatment the emerged weeds are destroyed while the seeds of the onions, beets or carrots are not affected.

We claim:

1. A method of killing weeds which comprises treating a member selected from the group consisting of seedlings and plants with an effective amount of a compound of the general formula

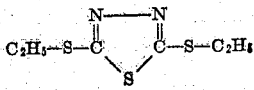

wherein R stands for a member selected from the group consisting of hydrogen, ammonium, alkali metal, lower alkyl, lower alkylene, phenyl, nitro-substituted phenyl, and di-lower-alkylamino carbonyl.

2. A method of killing weeds which comprises treating a member selected from the group consisting of seedlings and plants with an effective amount of a compound of the formula

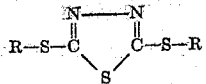

wherein R stands for an ethyl group.

3. A method of killing weeds which comprises treating a member selected from the group consisting of seedlings and plants with an effective amount of a compound of the formula

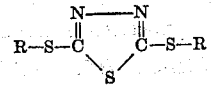

wherein R stands for an allyl group.

4. A method of killing weeds which comprises treating a member selected from the group consisting of seedlings and plants with an effective amount of a compound of the formula

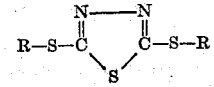

wherein R stands for a methyl group.

References Cited in the file of this patent
UNITED STATES PATENTS

| | | |
|---|---|---|
| 2,285,410 | Bousquet et al. | June 9, 1942 |
| 2,736,729 | Krzikalla et al. | Feb. 28, 1956 |
| 2,760,933 | Fields et al. | Aug. 28, 1956 |
| 2,765,289 | Fields et al. | Oct. 2, 1956 |